May 4, 1926.
F. ADRIAENSSENS
SPRING FASTENING FOR MOTOR CARS
Filed March 18, 1925
1,583,104
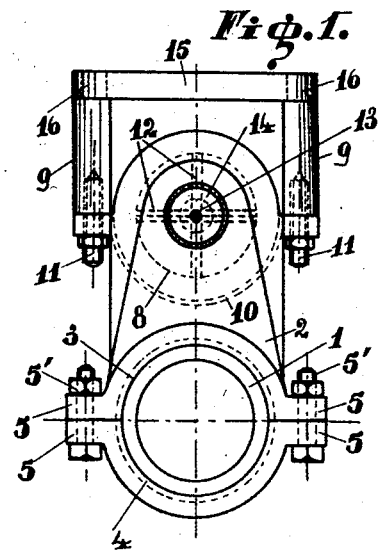
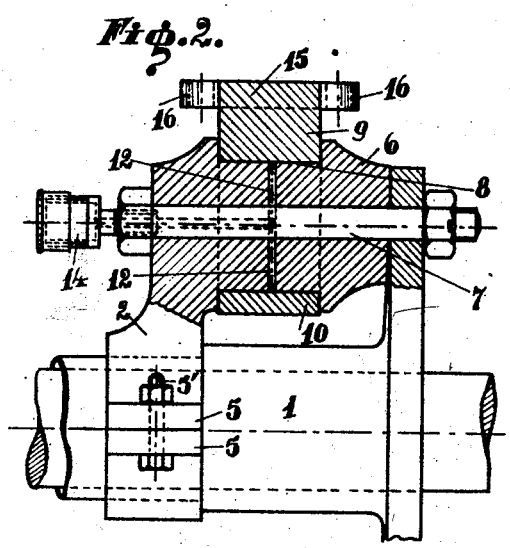
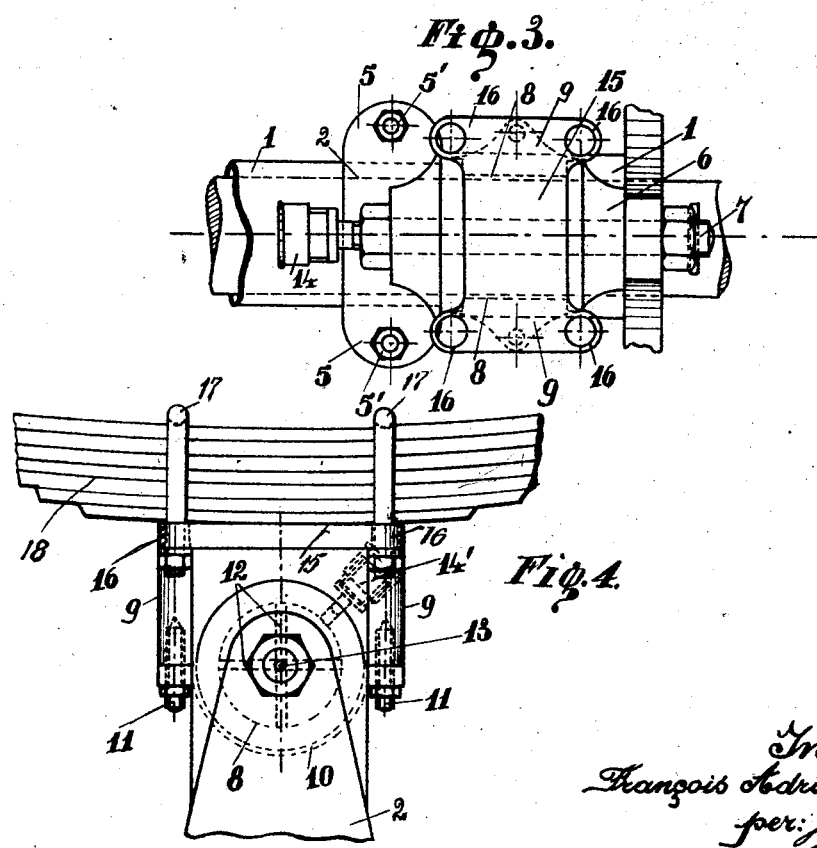
Inventor.
François Adriaenssens.
per: Hauer
Attorney.

Patented May 4, 1926.

1,583,104

UNITED STATES PATENT OFFICE.

FRANÇOIS ADRIAENSSENS, OF ANTWERP, BELGIUM.

SPRING FASTENING FOR MOTOR CARS.

Application filed March 18, 1925. Serial No. 16,505.

*To all whom it may concern:*

Be it known that I, FRANÇOIS ADRIAENSSENS, a subject of the King of the Belgians, residing at Antwerp, Belgium, 2 and 4 Rue Blanche, have invented a new and useful Improvement in Spring Fastenings for Motor Cars, of which the following is a specification.

The present invention relates to an improved device for fastening the central portion of the longitudinal side-springs of the known suspension to the casing of the rear axle of motor-cars having a rear axle casing with flanged ends, and is more particularly intended for application to cars of the well known "Ford" type, the chassis of such cars being suitably extended. An object of the invention is to impart greater freedom and elasticity to a suspension of the above mentioned type. In the known fastenings for longitudinal side springs, the spring-seat to which the central portion of the springs is clipped is fixed and is rigidly secured to the end portion of the axle casing, so that under the influence of impacts in a direction other than vertical, or when the chassis is inclined in the longitudinal plane, the springs are subjected to torques and to unequal tension efforts.

These drawbacks are obviated by the use of the device according to the present invention.

With the above mentioned main object in view, the said invention resides in the particular construction, arrangement and combination of parts constituting an improved spring fastening including a rocking spring-seat mounted on a fixed bracket member secured to the end-portions of the rear axle-casing and fitted with a suitable lubricating means.

In order that the invention may be readily understood, an embodiment of same is, by way of example, illustrated by the accompanying drawings, wherein:

Figures 1, 2 and 3 are respectively a front elevation, a side elevation, partly in section, and a top view of one construction of the device according to the invention, and Figure 4 is a partial front elevation of a slightly modified construction.

Referring to the said drawing, 1 indicates the end portion of the axle casing of the rear axle of a motor-car, adjacent the axle journal. To the said end portion is secured a fixed right angled bracket member comprising two arms 2 and 6 respectively. The vertical arm 2 forms at its lower end the two portions 3 and 4 respectively of a split-collar which is firmly clamped by means of bolts 5' passing through lugs 5 on the axle casing adjacent the shoulder forming the end portion 1. The second arm 6, which is integral with and extends with its axis at right angles to the arm 2, is substantially cylindrical and has its free end adjacent the flange of the end portion 1 of the axle casing. A fixing bolt 7 which extends axially through the arm 6 serves to secure the latter to the flange of the end portion 1, and the head of the said bolt is fitted with a grease cup which serves to lubricate a circumferential groove 8 formed in the arm 6 by means of a lubricating conduit 13 formed axially in the bolt 7 and of radial lubricating conduits 12 leading to the groove 8. This groove 8 forms a seat for a rocking member comprising two portions 9 each formed with a half-cylindrical surface corresponding in diameter to the grooved portion of the arm 6 of the bracket member. The lower portion 10 of the aforesaid rocking member forms a strap which is secured to the other portion by means of screws 11, so that the parts 9 and 10 together form a kind of bearing round the grooved portion of the arm of the bracket member and are able to rock freely on the said grooved portion. The upper portion 9 is formed with an integral spring-seat 15 to which the central portion of the leaf spring may be clamped by means of spring clips passing through holes provided in lugs 16 forming part of the spring-seat 15.

The free ends of the spring are connected by shackles in the usual manner to the car chassis, the latter being suitably lengthened in the case of a car of the "Ford" type so as to permit the use of longitudinally disposed suspension springs. In cases where owing to the type of coach work adapted or for any other reason the grease cup 14 would be in the way if placed in the manner illustrated by Figs. 1 to 3, the lubrication may be obtained by a grease cup feeding directly a lubricating groove provided in the surface of the grooved portion 8 of the bracket member, as shown in Fig. 4.

I claim:—

1. In an improved central spring fastening for rear-axle lateral longitudinal springs of motor-cars having a tubular rear axle-casing with flanged ends, the combination of:

a right-angled fixed bracket member comprising one arm formed with a collar adapted to be detachably clamped onto the axle casing and a substantially cylindrical second arm extending at right angles to the faces of said collar with its free end adjacent the end-flange of the aforesaid axle-casing, and having a circumferential groove formed therein; a fixing bolt extending axially through the last-named arm for securing the latter to the aforesaid end-flange; means for lubricating the circumferential groove of such last-named arm through said fixing-bolt; and a rocking member formed with an integral spring seat, rotatably mounted on the said last-named arm and engaging the said groove, said rocking member including a detachable strap-portion and the said spring-seat having holes formed therein for receiving spring-clips; substantially as described.

2. In an improved central spring fastening for rear-axle lateral longitudinal springs of motor-cars having a tubular rear-axle casing with flanged ends, the combination of: a right-angled fixed bracket member comprising one arm formed with a collar adapted to be detachably clamped onto the axle casing and a substantially cylindrical second arm extending at right angles to the faces of said collar with its free end adjacent the end-flange of the aforesaid axle-casing, and having a circumferential groove and radial lubricating conduits leading to said groove formed therein; a fixing-bolt for securing the last-named arm to the aforesaid end-flange, extending axially through the said arm and having a bored lubricating conduit leading from one end thereof to the aforesaid radial lubricating conduits; a grease-cup mounted on the end of said bolt for feeding the lubricating conduit thereof; and a rocking member rotatably mounted on the arm of the aforesaid bracket member having the circumferential groove formed therein and engaging the said groove, said rocking-member comprising an upper portion formed with a half-cylindrical surface and integral with a spring seat formed with lugs for securing spring clips thereto, and a lower strap-portion formed with a corresponding half cylindrical surface and secured to the upper portion by means of a pair of screws.

In testimony whereof I signed hereunto my name.

F. ADRIAENSSENS.